Patented Oct. 11, 1938

2,132,501

UNITED STATES PATENT OFFICE 2,132,501

MANUFACTURE OF RUBBER FILMS

Parke H. Watkins, Sandusky, Ohio, assignor, by mesne assignments, to United States Rubber Products, Inc., New York, N. Y., a corporation of Delaware No Drawing. Original application June 10, 1933, Serial No. 675,295. Divided and this application July 23, 1935, Serial No. 32,719

5 Claims. (Cl. 18—57)

This invention relates to the manufacture of rubber films, and more particularly to the manufacture of a removable rubber film by deposition of rubber from a rubber containing liquid on to a deposition surface.

Rubber films are commonly made by depositing rubber from a rubber containing liquid on to a deposition surface of the desired shape and after formation of a rubber film of the desired thickness removing the same from the surface. Thus forms such as gloves and balloon forms on which a rubber film is to be deposited are commonly dipped in a rubber containing liquid such as an organic solvent solution of rubber or an aqueous dispersion of rubber such as latex, and the rubber deposited from the rubber-containing liquid by drying, coagulation or the like, and the film of the desired shape, e. g. a glove or balloon, removed from the form. Rubber sheeting may also be made by spreading a rubber-containing liquid, such as latex, on to a flat deposition backing, depositing the rubber from the latex by coagulation and/or drying, and removing the finished film from the backing. In the preparation of these rubber films by deposition processes it is found that the film oftentimes adheres to the deposition surface or backing and it is difficult to remove it from the same, especially with automatic removing devices such as brushes, air nozzles, and the like.

The present invention relates to a method for facilitating the removal of rubber films from such deposition surfaces, and more particularly to the treatment of the surfaces prior to deposition of the rubber from a rubber containing liquid on to the same in order to effect easy removal of the rubber films subsequently deposited thereon.

In carrying out the present invention the deposition surface, which may be porous or non-porous as is common practice, and which in the case of dipping forms is generally of smooth, glazed porcelain, metal, glass, or treated wood or paper, or rubber for economic reasons, is treated with an oxidizing or a halogenating agent prior to the deposition of the rubber film on the surface. The treatment of the deposition surface with an oxidizing or halogenating agent prior to the deposition of the rubber film from the rubber containing liquid on the deposition surface provides an easily removable surface of the rubber film in contact with the deposition surface, and permits easy removal of the rubber film after the desired thickness of film has been built up, even with automatic devices used, for example, in commercial production of dipped articles.

The halogenating or oxidizing agent may be applied to the deposition surface by means of a solution or suspension in water or organic solvent, which may, if desired, contain additional materials such as wetting-out agents and binding agents to produce a uniform wetting of the form and retention for the desired period of time of the oxidizing or halogenating agent on the surface of the form. It is preferable to treat the deposition surface with the oxidizing or halogenating agent in an aqueous medium when the deposition of the rubber film is to be from an aqueous dispersion of rubber such as latex, and with halogenating or oxidizing agent in an organic solvent when the deposition of the rubber film is to be from a solvent cement, for example.

It is preferred to apply a dilute solution or suspension of the oxidizing or halogenating agent to the deposition surface rather than a concentrated one, since only small amounts of the oxidizing or halogenating agent are necessary for the production of an easily removable film. The deposition surface may be treated with a dilute solution or suspension of the oxidizing or halogenating agent and allowed to dry to a desired extent before application of the rubber containing liquid thereto. In forming rubber films from organic solvent solutions of rubber, such as rubber cements, the desired number of coats of rubber cement are applied to the form or the deposition surface with intermediate drying until the desired thickness has been built up. The treatment of such a form or deposition surface with a dilute solution of bromine, chlorine, or sulphur chloride such as a 2% to 5% solution for example in carbon tetrachloride before dipping into the rubber cement the first time and drying, will provide an easily removable inner surface of the rubber film contacting the deposition surface and will greatly facilitate removal of the film from the form. It may be desirable in certain commercial operations, in order to avoid unnecessary loss of any volatile halogen agent, to vary the previously described practice slightly. Since the first rubber film deposited from a solvent cement is sufficiently thin to be easily penetrable by solvent, it has been found satisfactory to apply the solvent solution of halogen agent later to such a deposited film, after only partial drying, secure the desired non-tacky effect on the rubber surface adjacent to the deposition surface, and then apply the desired number of layers of solvated rubber required to form the finished article. Furthermore, if desired, a dilute solution of halogenating agent may be admixed with a dilute rubber cement and the resulting solution used for depositing the first rubber film on the deposition surface. Precautions must be taken, however, in the latter method that only freshly admixed solutions are used and held under cool conditions. To illustrate, a 5% solution of rubber in benzene containing 0.25% sulphur chloride will start to gel in three to four hours at room temperature and become unsatisfactory for dipping operations.

In the manufacture of rubber films of the desired shape from aqueous dispersions of rubber, the form, for example, may be dipped in the dispersion, partially dried, and the dipping and drying operations repeated until the desired thickness of rubber film has been obtained. If desired, the form after being dipped in latex may be dipped in a coagulant for the latex, and the operations of dipping and coagulating repeated until the desired thickness of film has been obtained either with or without intermediate washing and/or drying steps between treatment with the coagulant and subsequent dipping in latex. Processes have also been developed where the form is first treated with a coagulant for the latex and subsequently dipped into the latex, allowing the coagulant to diffuse through the latex and build up the desired thickness of film in a single operation. Similarly, other processes have been developed in which the stability of the latex system used has first been reduced through the addition of divalent or trivalent metal salts so that rubber films of desired thickness are built up on heated forms in one step. In all these processes of forming rubber films on deposition backings from aqueous dispersions of rubber the treatment of the backing with an oxidizing or halogenating agent according to the present invention prior to the initial treatment with or dipping into the aqueous dispersion of rubber will minimize the adhesion of that surface of the deposited film next to the deposition surface and facilitate removal of the film from the surface. The deposition surface may be treated with one or both of an oxidizing or halogenating agent, alone or mixed with the desired wetting-out or binding agents and then the aqueous dispersion of rubber may be applied to the thus treated backing and the rubber deposited from the aqueous dispersion by means of a coagulant, or drying, or by internally heating the form as desired. If desired, the form may be treated with the oxidizing and/or halogenating agent of the present invention together with a coagulant for the aqueous dispersion of rubber and the surface then subsequently treated with the aqueous dispersion. The reduced adhesion to form and water absorption of such films as well as the comparative ease in building up films of definite thickness are all highly desirable and modifications in process following this explanation will be obvious to those skilled in the art.

Successful results have been obtained utilizing a 7½% aqueous suspension of calcium hypochlorite or 2% solution of sodium hypochlorite, or potassium or sodium dichromate, or potassium permanganate, for preliminary treatment of the deposition surface. A saturated aqueous solution of ammonium persulphate or an 8% aqueous solution of hydrogen peroxide, or aqueous solutions containing 8 parts of saturated chlorine water, or 10 parts of saturated bromine water, or 15 parts of saturated iodine water to which a small amount of potassium iodide has been added to increase the solubility, per 100 parts of water, or a 5% solution of benzoyl peroxide in ethyl alcohol, on the deposition surface will produce an easily removable film of rubber deposited from an aqueous dispersion of rubber. Various other oxidizing or halogenating agents or mixtures of same may be used and the concentrations may be varied as desired, the above concentrations merely being exemplary of the present preferred practices of the invention. Wetting-out agents such as Nekal, ammonium undecylinate and the like may be added to the oxidizing or halogenating agent to produce a uniform wetting of the deposition surface. Binding agents such as glycerine may be added to retain the oxidizing or halogenating agent on the surface of the form and to bind it to the surface until the treatment with the rubber-containing liquid. The rubber film may be removed from the deposition surface in the dry state but it is preferable to vulcanize such rubber films after partial drying to avoid blistering and before removal from the form to avoid distortion in shape. If vulcanized latex is used in the dipping or spreading or other operation, the film will of course be vulcanized before removal and may or may not be subjected to further vulcanizing conditions depending on the requirements of each specific application. If unvulcanized latex is applied to the deposition surface, the same may be vulcanized, preferably after a partial drying step, in heated air, steam, water, or aqueous solutions of accelerators as desired, all of which methods being well known in the art, and removed from the form in a vulcanized or semi-vulcanized condition.

The term "rubber" as used in the specification and claims includes natural and synthetic rubber and rubber-like materials. The term "rubber containing liquid" as used in the specification and claims is intended to include natural rubber latex, artificial aqueous dispersions of crude or reclaimed rubbers, solvated crude or reclaimed rubbers in the form of solvent rubber cement, and admixtures of same, either with or without curing ingredients, compounding ingredients, fillers, antioxidants, etc.

This application is a division of application Serial No. 675,295, filed June 10, 1933.

As various other modifications will occur to those skilled in the art, it is not intended to limit the invention other than as set forth in the appended claims.

Having thus described my invention what I claim and desire to protect by Letters Patent is:

1. The process of forming a removable rubber film on a deposition surface comprising applying to the surface a halogenating agent, and depositing rubber from a rubber-containing liquid on the thus treated surface while retaining at least some of the applied material on the deposition surface.

2. The process of forming a removable rubber film on a deposition surface comprising applying a solution of a halogenating agent in an organic solvent to the surface, and depositing rubber from a solution of rubber in an organic solvent on the thus treated surface while retaining at least some of the applied material on the deposition surface.

3. The process of forming a removable rubber film on a deposition surface comprising applying a solution of chlorine in an organic solvent to the surface, and depositing rubber from a solution of rubber in an organic solvent on the thus treated surface while retaining at least some of the applied material on the deposition surface.

4. The process of forming a removable rubber film on a deposition surface comprising applying a solution of sulphur chloride in an organic solvent to the surface, and depositing rubber from a solution of rubber in an organic solvent on the thus treated surface while retaining at least some of the applied material on the deposition surface.

5. The process of forming a removable rubber film on a deposition surface comprising applying chlorine water to the surface, and depositing rubber solids of an aqueous dispersion of rubber on the thus treated surface while retaining at least some of the applied material on the deposition surface.

PARKE H. WATKINS.